Oct. 31, 1950 W. H. NEWELL 2,528,284

MECHANICAL COMPUTER

Filed June 4, 1949 5 Sheets-Sheet 1

Inventor
WILLIAM H. NEWELL

By Victor D. Borst

Attorney

Oct. 31, 1950 W. H. NEWELL 2,528,284

MECHANICAL COMPUTER

Filed June 4, 1949 5 Sheets-Sheet 2

INVENTOR
WILLIAM H. NEWELL

BY Victor D. Borst
ATTORNEY

Oct. 31, 1950 W. H. NEWELL 2,528,284

MECHANICAL COMPUTER

Filed June 4, 1949 5 Sheets-Sheet 3

Inventor
WILLIAM H. NEWELL

By Victor D. Borst

Attorney

Oct. 31, 1950 W. H. NEWELL 2,528,284

MECHANICAL COMPUTER

Filed June 4, 1949 5 Sheets-Sheet 4

Inventor
WILLIAM H. NEWELL

By Victor D. Borst

Attorney

Oct. 31, 1950 W. H. NEWELL 2,528,284

MECHANICAL COMPUTER

Filed June 4, 1949 5 Sheets-Sheet 5

Inventor

WILLIAM H. NEWELL

By Victor D. Borst

Attorney

Patented Oct. 31, 1950

2,528,284

UNITED STATES PATENT OFFICE 2,528,284

MECHANICAL COMPUTER

William H. Newell, New York, N. Y., assignor to The Sperry Corporation, Long Island City, N. Y., a corporation of Delaware Application June 4, 1949, Serial No. 97,159

12 Claims. (Cl. 235—61)

This invention relates to mechanical computers for solving problems involving trigonometric functions and more particularly to a computer for solving problems of the type arising in the control of gunfire.

An object is to provide a relatively simple and accurate device of the above type.

Another object is to provide a device of the above type which may be used to obtain a plurality of computed quantities simultaneously.

Another object is to provide a device of the above type which is adapted to the rapid and continuous solution of problems involving higher mathematics.

Various other objects and advantages will be apparent as the nature of the invention is more fully disclosed.

The features of the invention will be better understood from the following description, taken in connection with the accompanying drawings in which certain specific embodiments have been set forth for purposes of illustration.

Figure 3:
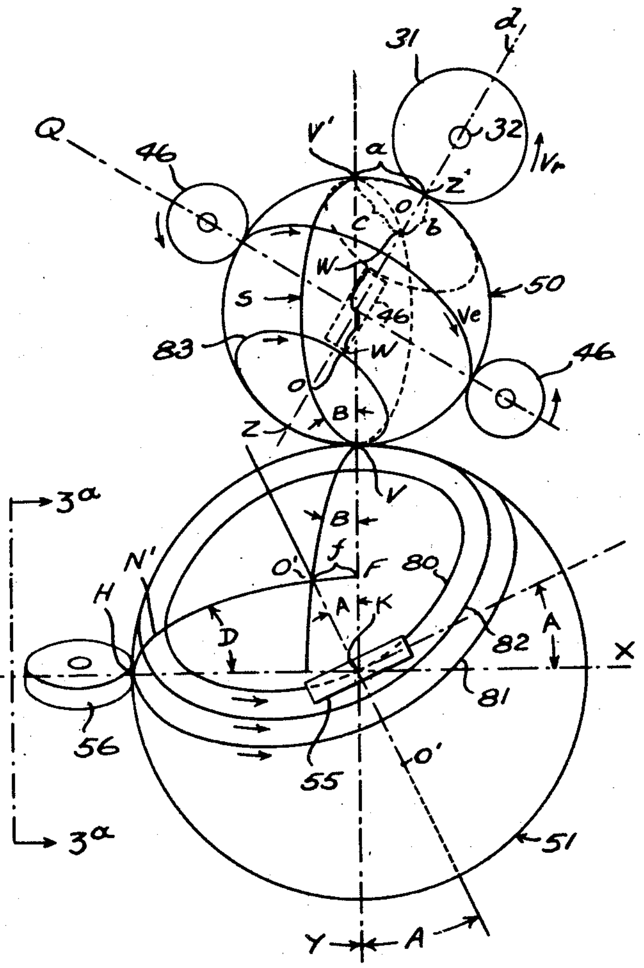
Fig. 3 is a diagrammatic view illustrating the manner of operation of the device of Figs. 1 and 2.
Figure 3A:
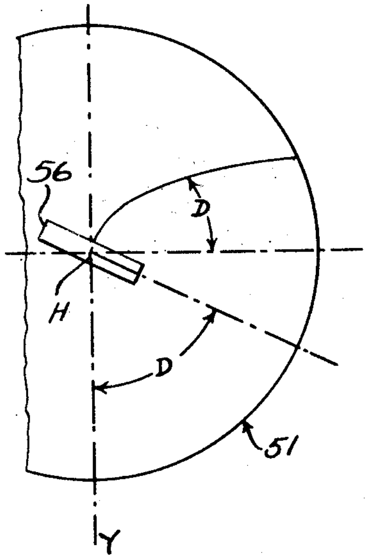

Fig. 3*a* is a diagrammatic view taken on the line 3*a*—3*a* and in direction of the arrows in Fig. 3.

Figure 4:
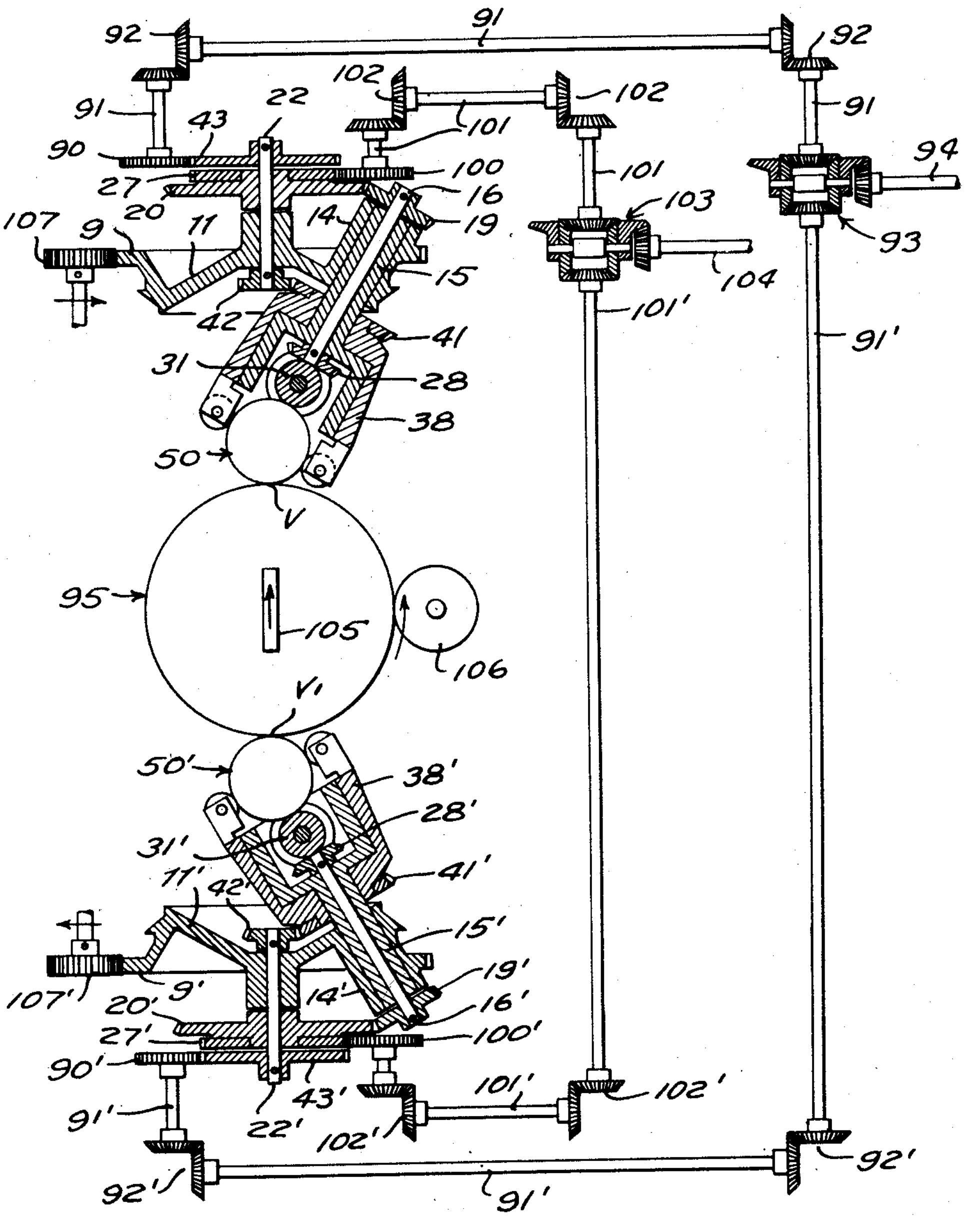

Fig. 4 is a schematic diagram illustrating a computer utilizing a pair of converting units.

Figures 5, 6, 7:
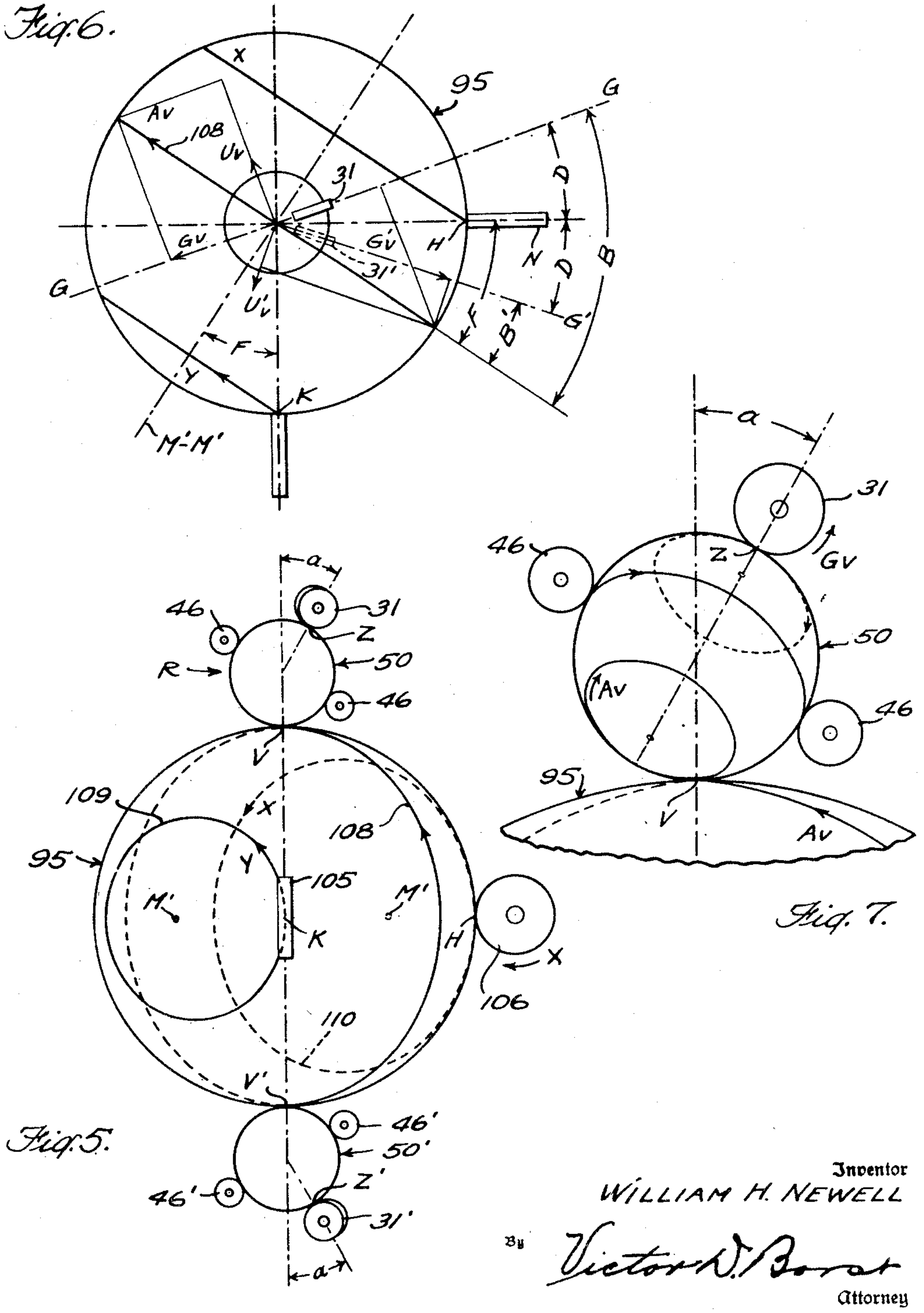

Figs. 5, 6 and 7 are diagrammatic views illustrating the manner of operation of the device of Fig. 4.

Figure 1:
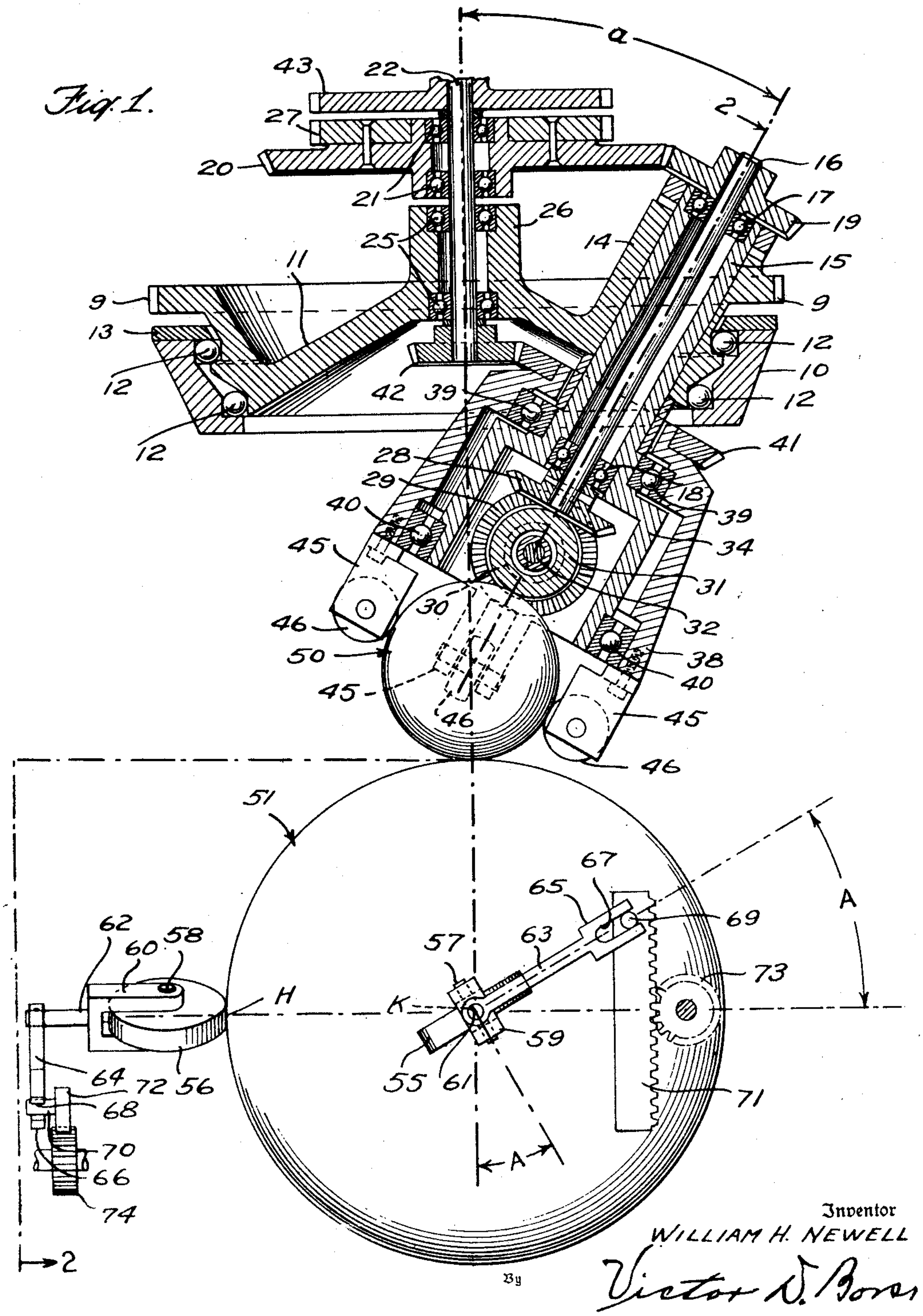
Fig. 1 is a side elevation of a computer embodying the invention showing the converting unit in section taken along the line 1—1 of Fig. 2.
Figure 2:
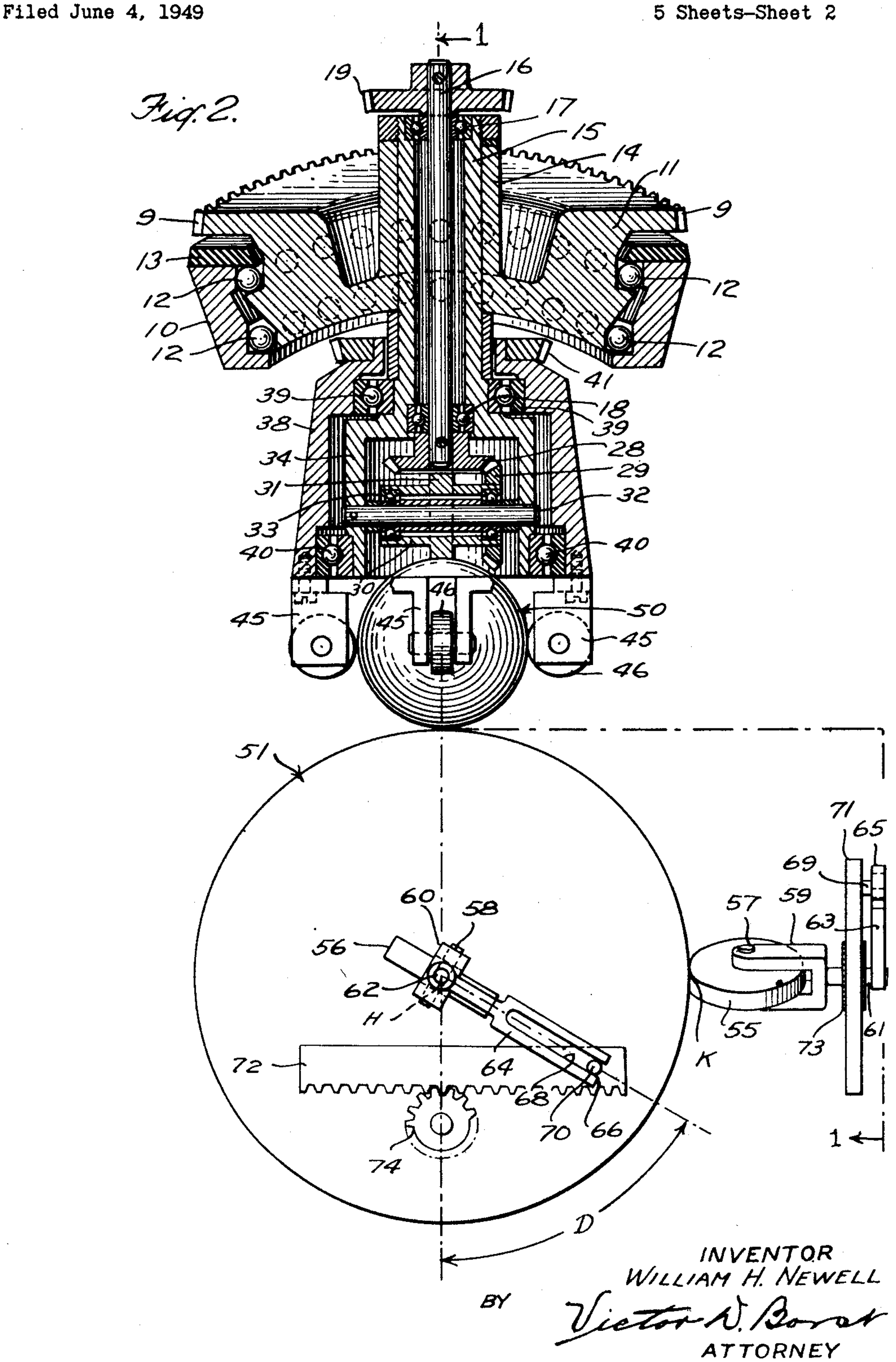
Fig. 2 is a side elevation taken at right angles to the view of Fig. 1 showing the converting unit in section taken along the line 2—2 of Fig. 1.

Referring to Figs. 1 and 2 the converting unit comprises a fixed housing 10 in which a rotatable housing 11 is mounted for rotation about a vertical axis by ball bearings 12 held by a retaining ring 13. The rotatable housing 11 includes a gear 9 and a boss 14 in which a sleeve 15 is fixed.

A shaft 16 is journalled in ball bearings 17 and 18 carried by the sleeve 15 and carries at its top end a bevel gear 19 meshing with a bevel gear 20 which is freely mounted on ball bearings 21 for rotation about a vertical shaft 22. The shaft 22 is journalled in ball bearings 25 in a central boss 26 of the rotatable housing 11. A spur gear 27 is pinned to the bevel gear 20.

The shaft 16 carries at its lower end a bevel gear 28 meshing with a bevel gear 29 mounted on a hub 30 of a roller 31 which is rotatably mounted to rotate about a shaft 32 on ball bearings 33. The shaft 32 is fixed in an enlarged portion 34 of the sleeve 15.

A cylindrical cage 38 is mounted on ball bearings 39 and 40 to rotate about the sleeve 15. The cage 38 carries a gear 41 meshing with a gear 42 fixed to the shaft 22. A gear 43 is also fixed at the top of the shaft 22. The cage 38 carries a plurality of brackets 45 in which rollers 46 are journalled for rotation about axes lying in a plane perpendicular to the axis of the shaft 16. A ball 50 contacts the rollers 46 and the roller 31.

The ball 50 rides on the surface of another ball 51 which is restrained from linear displacement by suitable bearings not shown. The arrangement is such that the axes of the shafts 16 and 22 intersect at the center of the ball 50, and the point of contact of the balls 50 and 51 lies in the axis of the vertical shaft 22.

A pair of guide rollers 55 and 56 contact the surface of the ball 51 at points displaced by 90° around the ball 51 from each other and also from the point of contact of the ball 50.

The guide rollers 55 and 56 are mounted for rotation about shafts 57 and 58 carried in yokes 59 and 60 which are pivoted on pins 61 and 62, respectively, whose axes lie in radii of the ball 51. Arms 63 and 64 are attached to the pins 61 and 62 and are provided with forked ends 65 and 66 having slots 67 and 68 engaging pins 69 and 70 mounted on racks 71 and 72 which mesh with gears 73 and 74, respectively. The gears and racks are supported by means not shown.

The operation of a cage and ball provided with a guiding roller is described in detail in my United States Patent No. 2,412,468, dated December 10, 1946, together with a mathematical analysis of the factors involved. The present invention is a further development of that system utilizing a second ball with two guiding rollers for shifting the axis of rotation of the balls as a function of the input quantities.

Referring to the diagram in Fig. 3 the ball 50 is in contact with the ball 51 at the point V. The roller 55 is in contact with the ball 51 at the point K and its axis is displaced from the vertical in the plane of the diagram (Figs. 1 and 3) by the angle A. The roller 56 is in contact with the ball 51 at the point H and its axis is displaced from the vertical in the plane of Fig. 3*a* by the angle D. When the angles A and D are both zero, both balls 50 and 51 and the roller 31 rotate in the plane of the diagram (Fig. 3) and the cage 38 remains stationary.

The angles A and D are two angles whose tangents represent input quantities introduced through gears 73 and 74 (Figs. 1 and 2). A third input quantity may be the angular velocity $V_r$ of the roller 31 which is driven by the gear 27 (Fig. 1). $V_r$ may be constant to represent time or may be variable. The output quantity may be represented by the rotation of the cage 38 about its axis as taken from the gear 43. The rotation of the cage 38 may, however, constitute an input quantity and the rate $V_r$ may constitute an output quantity.

In Fig. 3 the paths of the rollers 55 and 56 on the surface of the ball 51 are indicated by circles 80 and 81 and the axis of rotation of the ball 51 due to the positions of the guiding rollers 55 and 56 is indicated as O′—O′. The resultant path of the point V on the ball 51 is represented by the circle 82.

In ball 50 the axis of rotation due to the guiding effect of the ball 51 and the roller 31 is indicated by O—O and the path of the point V on the ball 50 is represented by circle 83.

A mathematical explanation of the relationship of the quantities follows:

In Fig. 3, in the right spherical triangle HKF, it is evident that the side KF is equal to the angle D.

In the right spherical triangle KFO′ the angle $O'KF$ = the angle A, and $\sin D \tan A = \tan f$.

In the right spherical triangle VFO′, the side $FV=90°-D$, and $\tan f \sec D = \tan B$.

On the ball 50, triangles VZO and V′Z′O are similar, and $$\sin a \cot B=\tan b=\cot W$$

Combining, $$\cot W= \sin a \cot A \cot D$$

Where:

B is the angle between the plane determined by the axis O′—O′ of rotation of the ball 51 and the axis Y, and that determined by the point of contact K and the axis Y.

W is the angle between the axis O—O of the ball 50 and the plane Q of the cage rollers 46.

$a$ is the angle between the axes of the ball 50 passing through the points of contact Z′ with the driving roller 31 and the point of contact V with the ball 51.

$b$ is the angular displacement of the axis O—O of the ball 50 in the plane d from the point of contact Z′ with the driving roller 31. $B=90°-W$.

$c$ is the angular displacement of the axis O—O of the ball 50 in the plane S from the axis of the ball 50 passing through the point of contact V with the ball 51.

And, where:

$V_e$ is the angular velocity of the ball 50,
$V_r$ is the angular velocity of the roller 31,
$k$ is the diameter of the driving roller 31 divided by the diameter of the ball 50, and
$V_c$ is the angular velocity of the cage 38, $$V_e \sin b=kV_r \text{ or } V_e=kV_r \sin b$$

$$V_c=V_e \cos b \quad V_c=kV_r \cos b/\sin b$$

$$V_c=kV_r/\tan b$$

Since $$\cot W=\sin a \cot A \cot D, \text{ and } b=90-W$$
$$\tan b=\sin a \cot A \cot D$$

$$V_c=kV_r/\sin a \cot A \cot D,$$

or since sine $a$ is constant for any particular construction, $$V_c=k'V_r \tan A \tan D$$

Hence if $V_r$ is introduced at the gear 27, tan A at the gear 73 and tan D at the gear 74, the rotation of the gear 43 represents the output $V_c$ in the above equation. Of course $V_c$ may constitute an input and $V_r$ an output. Other factors can be introduced by shifting the rollers 55 and 56 from the 90° points indicated.

Fig. 4 shows a device including a pair of converting units in contact with a common ball 95 at 180° points V and V′. Since the units are both similar to the unit of Figs. 1 and 2 all of the mechanical details have not been repeated. The parts of one unit are designated by reference characters used for corresponding parts of Figs. 1 and 2 and the parts of the other unit are given the same reference characters with a prime added.

In Fig. 4 the gears 43 and 43′ drive pinions 90 and 90′ which are connected by shafts 91 and 91′ and bevel gears 92 and 92′ to opposite sides of a differential 93 having a spider connected to drive an output shaft 94.

The gears 27 and 27′ drive pinions 100 and 100′ which are connected through shafts 101 and 101′ and bevel gears 102 and 102′ to opposite sides of a differential 103 having a spider driving an output shaft 104.

The ball 95 is guided by a pair of drive rollers 105 and 106 which in the embodiment shown make contact with the ball 95 at points K and H (Fig. 5) which are located 90° apart and 90° from the points V and V′. The rollers 105 and 106 are assumed to rotate about fixed axes normal to the radii of the ball 95 and lying in the same diametrical plane of the ball. The axes of the rollers 105 and 106, however, could be oriented and the points of contact K, H, V and V′ could be shifted on the ball 95 for introducing additional quantities.

Orientation of the axis of rotation of the ball 95 is determined by the relative surface velocities at the contact points H and K.

The axis M′—M′ assumed by the ball 95 makes the angle F (Fig. 6) with the axis of the ball through the point K. The angle F is equal to $\tan^{-1} Y/X$, where Y and X are equal or proportional to the surface velocities at the points of contact K and H, respectively.

A third factor may be introduced by rotating the converter units by the gears 9 and 9′ and pinions 107 and 107′ through equal angles D (Fig. 6) and in opposite directions about the axis passing through the points of contact V and V′.

The angle B is equal to angle F+angle D and the angle B′ is equal to angle F−angle D.

The surface velocity $A_v$ along path 108 at the points of contact V and V′ is X sec F.

The component $G_v$ of the surface velocity $A_v$ along the line G (Fig. 6) is $A_v$ cos B, and the component $G'_v$ along the line G′ is $A_v$ cos B′. $Z_v$ is the surface velocity of the point of contact Z of the roller 31 and the ball 50, and $Z'_v$ is the velocity of the point of contact Z′ of the roller 31′ and the ball 50′.

The components of the surface velocity $A_v$ along lines U and U′ perpendicular to the lines G and G′ are $U_v$ equal to $A_v$ sin B, and $U'_v$ equal to $A_v$ sin B′, respectively. Referring now to the cage rollers 46 and 46′, $U_v$ and $U'_v$ must be multiplied by the cosecant of the angle $a$ (Fig.

3), which may be represented by the constant $k$. The surface velocities in the plane of the cage rollers 46 and 46' then become $kU_v$ and $kU'_v$, respectively, from which the angular velocities of the cages may be determined as follows:

$$G_v = A_v \cos B = A_v \cos (F+D) = A_v \cos (\tan^{-1} Y/X + D)$$

$$A_v = X \sec F. \quad G_v = X \sec F \cos (\tan^{-1} Y/X + D)$$

$$G_v = \frac{X(\cos \tan^{-1} Y/X \cos D - \sin \tan^{-1} Y/X \sin D)}{\operatorname{Cos} \tan^{-1} Y/X}$$

$$G_v = X(\cos D - Y/X \sin D) = X \cos D - Y \sin D$$

Similarly $$G'_v = A_v \cos B' = A_v \cos (F-D) = X \cos D + Y \sin D$$

$$U_v = A_v \sin B = A_v \sin (F+D) = Y \cos D + X \sin D$$

Similarly, $$U'_v = Y \cos D - X \sin D$$

$L$ (the angular velocity of the cage 38) $= kU_v = k\ (Y \cos D + \sin D)$ $L'$ (the angular velocity of the cage 38') $= kU_v' = k\ (Y \cos D - X \sin D)$ Hence by introducing rates X and Y through rollers 106 and 105, respectively, and the angle D by gears 9 and 9' outputs $G_v$ and $G_v'$ are obtained from gears 27 and 27', outputs L and L' are obtained from cage gears 43 and 43'.

By adding the outputs $G_v$ and $G'_v$ and $U_v$ and $U'_v$ by means of the differentials 103 and 93, respectively, X cos D and Y cos D may be obtained on output shafts 104 and 94, respectively. Similarly by subtracting the outputs $G_v$ and $G_v'$ and $U_v$ and $U_v'$, Y cos D and X sin D may be obtained.

Of course the various inputs and outputs may be interchanged according to the result desired. In some instances three or more converting units may be used for obtaining still further quantities. One or both of the rollers 105 and 106 may be replaced by converting units. In each of these instances different mathematical equations may be solved.

The units may be connected to a disc instead of the large ball 51 or may be used to drive or be driven by a plane surface.

Other embodiments will be apparent to a person skilled in the art.

What is claimed is:

1. A computer comprising a rotatable ball restrained against lateral movement, a pair of guide rollers contacting the surface of said ball at spaced points, and a converting unit comprising a second ball contacting the surface of said first ball at a point spaced from said first points, a third roller contacting the surface of said second ball and in driving relationship therewith, a cage rotatable about an axis passing through the center of said second ball and inclined with respect to an axis passing through the centers of said balls, said cage carrying a plurality of cage rollers contacting said second ball in a diametrical plane thereof which is normal to the axis of said cage, each cage roller rotating about an axis lying in said diametrical plane, a housing carrying said cage and rotatable about the axis passing through the centers of said balls, means directing said housing about its axis, means in driving relationship to said third roller, means in driving relationship with said cage, means introducing quantities to be computed to certain of said driving means and means deriving computed quantities from other of said means.

2. In a computer as set forth in claim 1 means orienting the axes of said first rollers in accordance with input quantities for altering the axis of rotation of said first ball.

3. A computer as set forth in claim 1 in which said first rollers and said second ball contact said first ball at points 90° apart on the surface of said first ball.

4. A computer as set forth in claim 1, means driving said third roller, orienting said housing about its axis and orienting the axes of said first rollers in accordance with input quantities and means deriving an output quantity from said cage.

5. In a computer as set forth in claim 1 a second converting unit identical with the first converting unit and having a ball contacting said first ball at a point 180° from the point of contact of said second ball, means orienting the housings of said units by equal amounts in opposite directions in accordance with an input quantity, means driving said guide rollers in accordance with input quantities, means including a differential connected to combine the outputs from the third rollers of the two units and means including a differential connected to combine the outputs from the cages of the two units.

6. A computer comprising a rotatable member and a converting unit comprising a ball contacting the surface of said member, driving means contacting the surface of said ball and in driving relationship therewith, a second driving means rotating about an axis at an angle to the axis of the first driving means and in driving relationship with said ball, and means introducing quantities to be computed to said driving means.

7. A computer comprising a rotatable member and a converting unit comprising a ball contacting the surface of said member, a driving roller contacting the surface of said ball and in driving relationship therewith, a cage rotatable about an axis passing through the center of said ball and the point of contact of said driving roller and said ball and having means to drive said ball, and means introducing quantities to be converted to said driving roller and said cage.

8. A computer comprising a rotatable member and a converting unit comprising a ball contacting the surface of said member, a driving roller contacting the surface of said ball and in driving relationship therewith, a cage rotatable about an axis passing through the center of said ball and the point of contact of said ball and said roller, said cage carrying a plurality of cage rollers contacting said ball in a diametrical plane thereof which is normal to the axis of said cage, each cage roller rotating about an axis lying in said diametrical plane, and means introducing quantities to be computed to said first roller and said cage.

9. A computer comprising a rotatable ball restrained against lateral movement and a converting unit comprising a second ball contacting the surface of said first ball, driving means contacting the surface of said second ball and in driving relationship therewith, a second driving means rotating about an axis at an angle to the axis of the first driving means and in driving relationship to the said second ball, and means introducing quantities to be converted to said driving means.

10. A computer comprising a rotatable member and a converting unit comprising a ball contacting the surface of said member, driving means contacting the surface of said ball and in driving relationship therewith, a second driving means rotating about an axis at an angle to the axis of the first driving means and in driving relationship with said ball, a third driving means adapted to rotate the axis of one of said driving means about the axis of the other of said driving means, and means introducing quantities to be computed to said driving means.

11. A driving means consisting of a converting unit comprising a ball contacting a surface relative to which motion takes place, a driving roller contacting the surface of said ball and in driving relationship therewith, a cage rotatable about an axis passing through the center of said ball and the point of contact of said driving roller and said ball and having means to drive said ball, and means for introducing or removing quantities representing relative motion between the driving means and surface through either or both the said driving roller and said cage.

12. The combination of a driving means as set forth in claim 11 with means for rotating the converting unit about an axis passing through the center of said ball and the point of contact of the ball with the surface, said means permitting changing the direction in which relative motion is introduced or removed between the driving means and the surface.

WILLIAM H. NEWELL.

No references cited.